United States Patent Office 3,201,396
Patented Aug. 17, 1965

3,201,396
NOVEL 4,5-POLYMETHYLENE-(6H)-1,2,6-
THIADIAZINE-1,1-DIOXIDES
John B. Wright, Kalamazoo, Mich., assignor to The Upjohn Company, Kalamazoo, Mich., a corporation of Delaware
No Drawing. Filed Aug. 1, 1963, Ser. No. 299,177
7 Claims. (Cl. 260—243)

This invention pertains to novel organic compounds and to a process for preparing the same. More particularly, the invention is directed to novel 4,5-polymethylene-(6H)-1,2,6-thiadiazine-1,1-dioxides of the formula

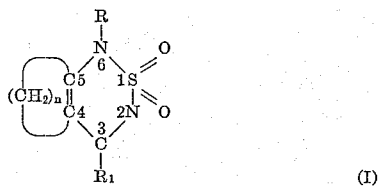

wherein R is hydrogen or alkyl; $R_1$ is hydrogen, alkyl, aryl, or substituted aryl; and $n$ is an integer from 3 to 6, inclusive. The invention is further more particularly directed to the process which comprises condensing sulfamide or an alkyl-sulfamide with a 2-acylcycloalkanone of the formula

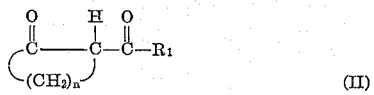

wherein $R_1$ and $n$ are as defined above.

In accordance with a preferred embodiment of the invention, R is selected from the group consisting of hydrogen and lower-alkyl, and $R_1$ is selected from the group consisting of hydrogen, lower-alkyl, phenyl, lower-alkylphenyl, halophenyl, and lower-alkoxyphenyl.

As used in this specification, the term "lower-alkyl" means alkyl of from 1 to 4 carbon atoms, inclusive, e.g., methyl, ethyl, propyl, butyl, and isomeric forms thereof; the term "halophenyl" means halogen-substituted phenyl wherein the halogen is selected from chlorine, bromine, iodine, and fluorine; and the term "lower-alkoxyphenyl" means phenyl substituted with one or more alkoxys of from 1 to 4 carbon atoms, inclusive, e.g., methoxyphenyl, trimethoxyphenyl, ethoxyphenyl, propoxyphenyl, butoxyphenyl, dibutoxyphenyl, and isomeric forms thereof.

In accordance with this invention, it has now been found that 4,5-polymethylene-(6H)-1,2,6-thiadiazine-1,1-dioxides having the Formula I above are useful as intermediates for reaction with chlorine to produce active-chlorine compounds. Thus for example, the compounds of Formula I wherein R is hydrogen can be reacted with chlorine to produce active-chlorine compounds in which the N-attached hydrogen atom at position 6 is replaced by a chlorine atom. Furthermore, the compounds of Formula I can be catalytically hydrogenated in the presence of a hydrogenation catalyst, e.g., platinum or palladium, to obtain the corresponding 4,5-polymethylene-tetrahydro-(6H)-1,2,6-thiadiazine-1,1-dioxides of the formula

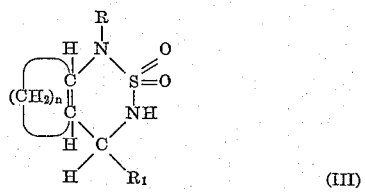

wherein R, $R_1$, and $n$ are as defined above. The compounds of Formula III are then reacted with chlorine to produce active-chlorine compounds in which one or two N-attached hydrogen atoms are replaced by chlorine. The degree of chlorination (whether one or two atoms of chlorine) depends upon the identity of R (whether hydrogen or lower-alkyl) as well as whether chlorination is effected with one molecular equivalent of chlorine or with two molecular equivalents. The aforesaid active-chlorine compounds are useful as disinfectants, bleaching agents, and antiseptics.

The novel compounds of Formula I are prepared by condensing a sulfamide of the formula

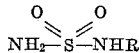

wherein R is as defined above, with a 2-acylcycloalkanone according to Formula II. The reactants are mixed in the presence of an inert reaction medium and acid catalyst. Suitable inert reaction media include methanol, ethanol, isopropyl alcohol, ethanol and water, dioxane, dimethylformamide, dioxane and water, dimethylformamide and water, and the like. Suitable acid catalysts include, for example, hydrogen chloride, sulfuric acid, p-toluenesulfonic acid, hydrogen bromide, and the like. The reaction proceeds satisfactorily at temperatures ranging from about 20° C. up to about 100° C., and, advantageously, the reaction mixture is heated at a temperature in the range of about 60° C. up to about 100° C. in order to assure completion of the reaction in a convenient interval of time. The 4,5-polymethylene-(6H)-1,2,6-thiadiazine-1,1-dioxide thus produced is separated from the reaction mixture and recovered in pure form by conventional procedures such as filtration, solvent evaporation, solvent extraction, and crystallization.

Alternatively, the novel compounds of Formula I wherein R is lower-alkyl can be conveniently prepared by condensing sulfamide with a 2-acylcycloalkanone of Formula II and reacting the thus-produced 4,5-polymethylene-(6H)-1,2,6-thiadiazine-1,1-dioxide (compound according to Formula I wherein R is hydrogen) with a diazoalkane, e.g., diazomethane, diazoethane, diazopropane, and diazobutane, to produce the corresponding 6-lower-alkyl-4,5-polymethylene-(6H)-1,2,6-thiadiazine-1,1-dioxide. The reaction of a 4,5-polymethylene-(6H)-1,2,6-thiadiazine-1,1-dioxide with a diazoalkane (preferably an ethereal solution thereof) is conveniently effected at temperatures ranging between about 10° C. and about 30° C. in the presence of an inert reaction medium such as methylene chloride, chloroform, carbon tetrachloride, and the like.

The 2-acylcycloalkanone starting compounds having the Formula II wherein $R_1$ is alkyl, aryl, or substituted aryl, many of which are known, can be prepared according to the method described by Eistert et al., Ann. 650, 133–156 (1961). The 2-acylcycloalkanone starting compounds having the Formula II wherein $R_1$ is hydrogen can be prepared by a Claisen condensation of a cycloalkanone (cyclopentanone, cyclohexanone, cycloheptanone, or cyclooctanone) with an alkyl formate, preferably ethyl formate.

The following examples are illustrative of the process and products of the present invention, but are not to be construed as limiting.

*Example 1.—Preparation of 3-methyl-4,5-tetramethylene-(6H)-1,2,6-thiadiazine-1,1-dioxide*

Dry hydrogen chloride gas was bubbled into a mixture consisting of 86.0 g. (0.61 mole) of 2-acetylcyclohexanone, 58.8 g. (0.61 mole) of sulfamide, and 480 ml. of absolute ethanol with thorough stirring until the temperature of the reaction mixture reached 60° C. The mixture was then heated at the reflux temperature for ½ hr. and set aside for two days. After concentrating the reaction mixture to dryness under reduced pressure, the residue was recrystallized from 95% ethanol. There was thus obtained 105.4 g. (86% yield) of 3-methyl-4,5-tetramethylene-(6H)-1,2,6-thiadiazine-1,1-dioxide [by alternative nomenclature, 5,6,7,8 - tetrahydro - 4 - methyl-(1H)-2,1,3 - benzothiadiazine - 2,2-dioxide] as colorless prisms melting at 180° to 181° C.

*Analysis.*—Calcd. for $C_8H_{12}N_2O_2S$: C, 47.98; H, 6.04; N, 13.99; S, 16.01. Found: C, 48.25; H, 6.28; N, 13.60; S, 16.18.

Following the same procedure but substituting 2-formylcyclohexanone, 2-propionylcyclohexanone, 2-isobutyrylcyclohexanone, and 2-valerylcyclohexanone for 2-acetylcyclohexanone, there were prepared 4,5-tetramethylene - (6H)-1,2,6-thiadiazine - 1,1-dioxide, 3-ethyl-, 3-isopropyl-, and 3-butyl-4,5-tetramethylene-(6H)-1,2,6-thiadiazine-1,1-dioxide, respectively.

*Example 2.—Preparation of 3-phenyl-4,5-tetramethylene-(6H)-1,2,6-thiadiazine-1,1-dioxide*

Part A.—2-benzoylcyclohexanone: A solution of 94.0 g. (0.67 mole) of benzoyl chloride in 200 ml. of chloroform [purified as described in Angew. Chem., 68, 752 (1958)] was added with thorough stirring to a solution of 112.5 g. (0.67 mole) of 1-morpholino-1-cyclohexene and 67.5 g. (0.67 mole) of triethylamine in 900 ml. of chloroform. The benzoyl chloride was added at a temperature of about 0° C. After setting the reaction mixture aside for about 16 hrs., it was acidfied with aqueous hydrochloric acid prepared by mixing 90 ml. of concentrated hydrochloric acid with 225 ml. of water. The acidfied mixture was heated to the reflux temperature and then cooled. After separating the chloroform layer, the aqueous layer was extracted with chloroform. The combined extract and initially separated chloroform layer was dried with anhydrous magnesium sulfate. The dried solution was treated with a decolorizing agent and the chloroform was evaporated under reduced pressure. The semisolid residue thus obtained was recrystallized from 95% ethanol to give 83.55 g. of 2-benzoylcyclohexanone having a melting point of 90° to 91.5° C. (Eistert et al., supra, give 92° to 93° C.).

Part B.—3-phenyl-4,5-tetramethylene-(6H)-1,2,6-thiadiazine-1,1-dioxide: Dry hydrogen chloride gas was bubbled into a mixture consisting of 20.22 g. (0.1 mole) of 2-benzoylcyclohexanone (Part A, above), 9.6 g. (0.1 mole) sulfamide, and 80 ml. of absolute ethanol with thorough stirring until the temperature of the mixture reached about 65° C. The reaction mixture was then heated at the reflux temperature for ½ hour before setting aside for 2 hours. The ethanol was removed by evaporation under reduced pressue, and the residue thus obtained was recrystallized from isopropyl alcohol. There was thus obtained 22.15 g. of 3-phenyl-4,5-tetramethylene-(6H)-1,2,6-thiadiazine-1,1-dioxide [by alternative nomenclature, 5,6,7,8-tetrahydro-4-phenyl-(1H)-2,1,3-benzothiadiazine-2,2-dioxide] as colorless needles melting at 141° to 143° C. A second recrystallization from isopropyl alchol gave colorless needles melting at 141° to 142° C.

*Analysis.*—Calcd. for $C_{13}H_{14}N_2O_2S$: C, 59.52; H, 5.38; N, 10.68; S, 12.22. Found: C, 59.35; H, 5.21; N, 10.77; S, 12.26.

Following the same procedure but substituting 2-benzoylcyclopentanone, 2-benzoylcycloheptanone, and 2-benzoylcyclooctanone for 2 - benzoylcyclohexanone, there were prepared 3-phenyl-4,5-trimethylene-, 3-phenyl-4,5-pentamethylene-, and 3-phenyl-4,5-hexamethylene-(6H)-1,2,6-thiadiazine-1,1-dioxide, respectively.

*Example 3.—Preparation of 3-(3,4,5-trimethoxyphenyl) 4,5-tetramethylene-(6H)-1,2,6-thiadiazine-1,1-dioxide*

A mixture consisting of 5.0 g. (0.017 mole) of 2-(3,4,5-trimethoxybenzoyl)cyclohexanone (prepared by substituting 3,4,5-trimethoxybenzoyl chloride for benzoyl chloride in the procedure of Example 2, Part A), 1.64 g. (0.017 mole) of sulfamide, and 50 ml. of absolute ethanol was treated with dry hydrogen chloride gas until the temperature of the mixture had increased to 60° C. The resulting yellow solution was then heated at the reflux temperature for ½ hr. before the ethanol was removed by evaporation under reduced pressure. The residue thus obtained was triturated with ether and water and recovered on a filter. There was thus obtained 6.08 g. of 3-(3,4,5 - trimethoxyphenyl) - 4,5-tetramethylene-(6H)-1,2,6-thiadiazine-1,1-dioxide [by alternative nomenclature, 5,6,7,8 - tetrahydro - 4-(3,4,5 - trimethoxyphenyl)-(1H)-21,3-benzothiadiazine-2,2-dioxide] as a white solid melting at 214° to 216° C. Recrystallization from 95% ethanol gave 4.75 g. of the compound as yellow tinted prisms melting at 213° to 215° C.

*Analysis.*—Calcd. for $C_{16}H_{20}N_2O_5S$: C, 54.53; H, 5.72; N, 7.95; S, 9.10. Found: C, 54.70; H, 6.06; N, 7.84; S, 9.03.

*Exampla 4.—Preparation of 3-(p-methoxyphenyl)-4,5-tetramethylene-(6H)-1,2,6-thiadiazine-1,1-dioxide*

A mixture consisting of 5.0 g. (0.0215 mole) of 2-(p-methoxybenzoyl)cyclohexanone (prepared by substituting p-methoxybenzoyl chloride for benzoyl chloride in the procedure of Example 2, Part A), 2.07 g. (0.0215 mole) of sulfamide, and 50 ml. of absolute ethanol was thoroughly stirred and treated with dry hydrogen chloride gas until the temperature of the reaction mixture reached 60° C. The yellow solution thus obtained was heated at the reflux temperature for ½ hr. before evaporating the ethanol under reduced presure. The residue thus obtained was triturated with ether and water and recovered on a filter. The filter cake was recrystallized from isopropyl alcohol to give 5.24 g. (83% yield) of 3-(p-methoxyphenyl) - 4,5-tetramethylene - (6H)-1,2,6-thiadiazine-1,1-dioxide [by alternative nomenclature, 5,6,7,8-tetrahydro-4-(p-methoxyphenyl) - (1H) - 2,1,3-benzothiadiazine-2,2-dioxide] as yellow tinted prisms melting at 149° to 151° C. A second recrystallization from isopropyl alcohol gave yellow tinted prisms melting at 148° to 150° C.

*Analysis.*—Calcd. for $C_{14}H_{16}N_2O_3S$: C, 57.52; H, 5.52; N, 9.58; S, 10.97. Found: C, 57.54; H, 5.42; N, 9.53; S, 11.02.

*Example 5*

Following the procedure of Example 2, Part A, but substituting m-toluoyl chloride, o-chlorobenzoyl chloride, p-bromobenzoyl chloride, 3,5-diiodobenzoyl chloride, p-fluorobenzoyl chloride, p-ethoxybenzoyl chloride, m-isopropoxybenzoyl chloride, o-butoxybenzoyl chloride, and p-butylbenzoyl chloride for benzoyl chloride, there were prepared 2-(m-toluoyl)cyclohexanone, 2-(o-chlorobenzoyl)cyclohexanone, 2 - (p-bromobenzoyl)cyclohexanone, 2 - (3,5-diiodobenzoyl)cyclohexanone, 2-(p-fluorobenzoyl)cyclohexanone, 2 - (p-ethoxybenzoyl)cyclohexanone, 2-(m-isopropoxybenzoyl)cyclohexanone, 2-(o-butoxybenzoyl)cyclohexanone, and 2-(p-butylbenzoyl)cyclohexanone, respectively.

*Example 6*

Following the procedure of Example 3, but substituting 2-(m-toluoyl)cyclohexanone, 2 - (o-chlorobenzoyl)cyclohexanone, 2-(p-bromobenzoyl)cyclohexanone, 2-(3,5-diiodobenzoyl)cyclohexanone, 2 - (p - fluorobenzoyl)cyclohexanone, 2-(p-ethoxybenzoyl)cyclohexanone, 2-(m-isopropoxybenzoyl)cyclohexanone, 2-(o-butoxybenzoyl)cyclohexanone, and 2-(p-butylbenzoyl)cyclohexanone for 2 - (3,4,5-trimethoxybenzoyl)cyclohexanone, there were prepared 3-(m-tolyl)-, 3-(o-chlorophenyl)-, 3-(p-bromophenyl)-, 3-(3,5-diiodophenyl)-, 3-(p-fluorophenyl)-, 3-(p-ethoxyphenyl)-, 3 - (m-isopropoxyphenyl)-, 3 - (o-butoxyphenyl)-, and 3-(p-butylphenyl)-4,5-tetramethylene-(6H)-1,2,6-thiadiazine-1,1-dioxide, respectively.

Example 7

Following the procedure of Example 1, but substituting methylsulfamide, ethylsulfamide, isopropylsulfamide, and butylsulfamide for sulfamide, there were prepared 3,6-dimethyl-4,5-tetramethylene - (6H) - 1,2,6-thiadiazine,1,1-dioxide, 6-ethyl-3-methyl-, 6-isopropyl-3-methyl-, and 6-butyl - 3-methyl - 4,5-tetramethylene-(6H)-1,2,6-thiadiazine-1,1-dioxide, respectively.

I claim:
1. The compound of the formula

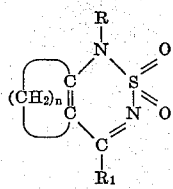

wherein R is selected from the group consisting of hydrogen and lower-alkyl; $R_1$ is selected from the group consisting of hydrogen, lower-alkyl, phenyl, lower-alkylphenyl, halophenyl, and lower-alkoxyphenyl; and $n$ is an integer from 3 to 6, inclusive.

2. 3 - lower-alkyl - 4,5-tetramethylene-(6H)-1,2,6-thiadiazine-1,1-dioxide.

3. 3 - methyl - 4,5-tetramethylene - (6H)-1,2,6-thiadiazine-1,1-dioxide.

4. 3 - lower-alkoxyphenyl - 4,5 - tetramethylene-(6H)-1,2,6-thiadiazine-1,1-dioxide.

5. 3 - (p-methoxyphenyl) - 4,5 - tetramethylene - (6H)-1,2,6-thiadiazine-1,1-dioxide.

6. 3 - (3,4,5 - trimethoxyphenyl) - 4,5 - tetramethylene-(6H)-1,2,6-thiadiazine-1,1-dioxide.

7. 3- phenyl-4,5-tetramethylene-(6H)-1,2,6-thiadiazine-1,1-dioxide.

References Cited by the Examiner

UNITED STATES PATENTS 2,454,262 11/48 Walter _____ 260—243
2,956,997 10/60 Teufel _____ 260—243

OTHER REFERENCES

Cohen et al., "Journ. of the Am. Chem. Soc.," vol. 84, pp. 1994–2002 (1962).

Degering et al., "Journal of Organic Chemistry," vol. 17, pp. 339–341 (1952).

German Auslegeschrift, 1,120,456, Dec. 28, 1961.
German Auslegeschrift, 1,120,457, Dec. 28, 1961.

WALTER A. MODANCE, *Primary Examiner.*

NICHOLAS S. RIZZO, *Examiner.*